US012562008B1

(12) United States Patent
Jefferies et al.

(10) Patent No.: US 12,562,008 B1
(45) Date of Patent: Feb. 24, 2026

(54) DIGITAL LOTO

(71) Applicant: Schneider Electric USA, Inc., Andover, MA (US)

(72) Inventors: Kevin M. Jefferies, Raleigh, NC (US); Benjamin W. Edwards, Rolesville, NC (US); Matthew L. White, Cary, NC (US); Alan E. Freeman, Raleigh, NC (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/954,817

(22) Filed: Nov. 21, 2024

(51) Int. Cl.
*G07C 1/32* (2006.01)

(52) U.S. Cl.
CPC .......................... *G07C 1/32* (2013.01)

(58) Field of Classification Search
CPC .......................... G07C 1/32
See application file for complete search history.

(56) References Cited

U.S. PATENT DOCUMENTS 11,281,877 B2 * 3/2022 Swartz .................. G06Q 10/20

* cited by examiner

*Primary Examiner* — Robert L Deberadinis
(74) *Attorney, Agent, or Firm* — Wolf, Greenfield & Sacks, P.C.

(57) ABSTRACT

A method and system are provided facilitating worker safety in an electrical system. In the method and system, a request is received from a user to perform a lockout/tagout (LOTO) for equipment in the electrical system. An isolation device(s) is identified for electrically isolating the equipment from an electrical energy source(s) in the electrical system. A digital LOTO procedure is performed for the equipment, which includes controlling shutdown of the equipment; controlling an operation of the isolation device(s) to isolate the equipment from the energy source(s); performing digital lockout for the equipment by setting a lockout status for the equipment which prohibits or prevent unauthorized release of the lockout; and providing a digital record of the lockout which reflects a lockout status of the energy source(s) from the equipment, identifies the user responsible for the request, and provides notice of the lockout status for the equipment.

21 Claims, 10 Drawing Sheets

DIGITAL LOTO

FIELD

The present disclosure is generally directed to safety procedures in an electrical system, and more specifically to a method and system for digital (or electronic) implementation of lockout and/or tagout in an electrical system.

BACKGROUND

Various safety protocols have been developed and are in use to protect workers from hazardous conditions, such as from the operation of electrically-powered equipment or from release of hazardous electrical energy, when they work on or service such equipment (including machinery) at a worksite. One such safety protocol is Lockout/Tagout (LOTO). With LOTO, all power sources are disconnected from equipment to be serviced and locked in the off position. For example, each technician working on the equipment manually locks out the power with their own personal lock and key so they have control of the energy source. The technician places a tag on the lock to warn others (e.g., people other than the technician) and to identify the responsible party. Before beginning work, the technician tests the energy source to ensure that it is locked out from supplying electrical energy to the equipment. No one else can remove another person's lock, thereby ensuring that another person cannot turn on the equipment.

SUMMARY

In accordance with an embodiment, a computer-implemented method is provided for facilitating worker safety in an electrical system. The method includes receiving a request from a user to perform a lockout/tagout (LOTO) for equipment in the electrical system; identifying an isolation device(s) for electrically isolating the equipment from an electrical energy source(s) in the electrical system; and performing a digital lockout/tagout (LOTO) procedure for the equipment. The digital LOTO procedure includes controlling shutdown of the equipment; controlling an operation of the isolation device(s) to isolate the equipment from the electrical energy source(s); performing digital lockout for the equipment by setting a lockout status for the equipment which prohibits or prevent unauthorized release of the lockout; and providing a digital record of the lockout which reflects a lockout status of the energy source(s) from the equipment, identifies the user responsible for the request, and provides notice of the lockout status of the energy source(s) from the equipment. The notice can be provided to others, e.g., people/users other than the user, who may for example be affected by the lockout for the equipment.

In various embodiments, the performing a digital lockout can further include controlling a lockout device(s) to lock the isolation device(s), thereby preventing operation thereof and/or access thereto.

In various embodiments, the equipment is associated with a sub-process or sub-system of an industrial process. The method can further include: identifying other equipment for the sub-process or sub-system of the industrial process in the electrical system; and controlling shutdown of the other electrical equipment, or performing a digital lockout/tagout for the other equipment.

In various embodiments, the performing the digital lockout/tagout procedure can further include: electronically notifying one or more entities of the lockout status of the energy source(s) from the electrical equipment.

In various embodiments, the method can further include: receiving identifier data from the user device identifying the equipment; and searching a database to identify the equipment from a plurality of equipment in the electrical system based on the identifier data. The identifier data can be obtained by the user device at the location of the electrical equipment using one or more sensors of the user device.

In various embodiments, the method can further include: controlling the isolation device(s) or an output device(s) associated therewith to perform a confirmation operation, from which information is obtained by the user for confirmation of the isolation device(s) or position thereof. The digital lockout/tagout procedure is performed after confirmation of the isolation device(s) or position thereof, in response to the request. The confirmation operation can be a sequence of operations which are performed by the isolation device(s) or the output device(s) associated therewith.

In various embodiments, the digital record or lockout status for the equipment can be stored in a database as a public ledger on non-volatile memory.

In various embodiments, the method can further include: receiving a release request for releasing the lockout status of the energy source(s) from the equipment; checking whether the release request is from an authorized entity, the authorized entity including at least the user; and in response to the release request being from an authorized entity, releasing the lockout or state thereof to enable the energy source(s) to be connected to the equipment via the isolation device(s).

In various embodiments, the method can further include: generating a unique digital key for the user; and providing the digital key to the user device for use in releasing the lockout of the energy source(s) from the equipment.

In various embodiments, the request can be to perform the lockout/tagout procedure for equipment for a sub-process or sub-system of an industrial process. The method can further include: identifying each of the equipment in the sub-process or sub-system of the industrial process, wherein the digital lockout/tagout procedure is performed for each of the identified equipment for the sub-process or subsystem.

In accordance with various embodiments, a system is provided for facilitating worker safety in an electrical system. The system can include a memory and a processor, in a communication with the memory. The system or components thereof are configured to perform the computer-implemented method such as described above.

In accordance with various embodiments, a non-transitory computer medium is provided for storing computer executable code, which when executed by one or more processors, implements a method of facilitating worker safety in an electrical system a system, such as described above.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

Figure 1:
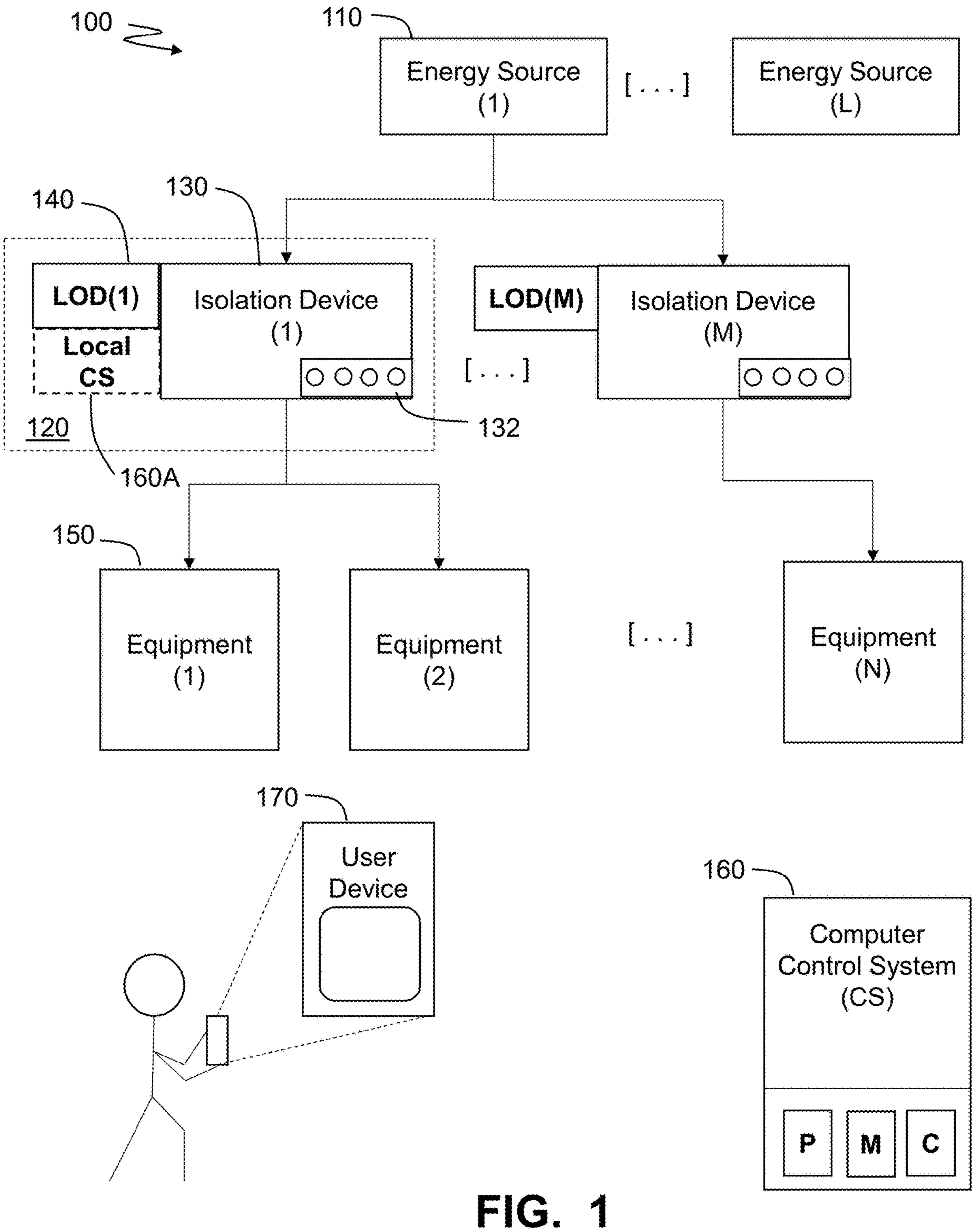
FIG. 1 is a block diagram of an example electrical system with digital lockout/tagout (LOTO) functionality for locking out energy source(s) from desired equipment and providing a digital record of the lockout event, in accordance with an embodiment of the present disclosure.

A method and system are provided for facilitating digital (or electronic) lockout/tagout (LOTO) operations for digital-based (or digital) lockout of energy source(s) from equipment for which work is to be performed by a user (e.g., service, maintenance, repair, diagnostics, etc.) and a digital tagout of the lockout event, in accordance with various embodiments. In the digital LOTO method and system, a computer-based lockout/tagout control device or system (hereinafter "control system") can be configured to receive a request by a user to perform digital LOTO for equipment, and to coordinate, control and/or perform digital LOTO-related operations including, for example, notification, shutdown, isolation, lockout, tagout and other operations for desired equipment in response to the user's request. The user can provide the LOTO request to the control system, via a user device, though a LOTO application (or the like). The control system can identify all energy sources supplying electrical energy to the equipment, isolate the energy source(s) from the equipment using an isolation device(s)/system(s), and lockout the energy source from the equipment by setting a lockout status (or state) which prohibits or prevents unauthorized release of the lockout or unauthorized operation of the isolation device(s)/system(s). The control system also can perform a digital tagout operation by providing a digital/electronic record (or tag) reflecting the lockout status of the energy source(s) from the equipment, and the identity of the user responsible for the lockout. The lockout state/record can be stored in a database, such as a public ledger or the like, in a non-volatile memory, and can provide notice to others of the lockout, such as those who may be affected by the lockout for the equipment. In some embodiments, as a further precaution, the control system can also control a lockout device (or LOD) associated with or incorporated in the insolation device as part of an isolation system to lock the isolation device, and thus, prevent operation of the isolation device, such as for example after the energy source(s) has been isolated from the equipment.

After the work is completed by the user on or in relation to the equipment, at the request of an authorized entity/user such as the user responsible for the digital LOTO request, the control system can release (e.g., release, remove, unlock, or open) the lockout of the energy source(s), from the equipment to enable connection of the energy source(s) to the equipment (or vice-a-versa. For example, the control system can change/update the lockout state for the equipment or associated energy source(s) or isolation device(s)/system(s) to an unlocked (or released) status, The control system also can provide a digital record of the release event accordingly to reflect the unlocked status of the energy source(s) from the equipment.

Accordingly, in the digital LOTO method and system, the control system can prohibit or prevent unauthorized users other than an authorized entity, such as the user responsible for the lockout, from releasing the lockout status of the energy source(s) from the equipment. In various embodiments, the user can be provided with a unique digital key, either through registration or in response to digital LOTO request or lockout, which can be used to release a lockout, which was performed at the request of the user. It is understood that various authentication schemes can be implemented to verify the identity of an authorized user.

In various embodiments, in the digital LOTO method and system, a lockout can be managed remotely, using electronic control of the energy source(s) in the electrical system. For example, at some place other than the LOTO point (e.g., at an operator control panel, at a motor, at driven machine, etc.), a user can communicate with the control system which provides for digital LOTO for desired equipment, through a computer-based user device with communication capabilities. Through the user device, the user can establish LOTO "location" for desired equipment (e.g., motor, driven machine, etc.) with the control system, and request digital LOTO from the control system to lockout all energy sources from the desired equipment, and provide a digital record (e.g., a digital tag) for the lockout event (or lockout). At the user's request, the control system can identify isolation devices (or points thereof) for isolating all of the energy sources from the equipment, and perform at least digital lockout of all of the energy sources from the equipment to prevent unauthorized release of the lockout. The control system can lockout energy source(s) from the equipment, and confirm the lockout to the user. In turn, the user can confirm the lockout of the energy source locally (e.g., confirm equipment is unpowered), and afterwards, perform desired work on the unpowered equipment. In the digital LOTO implementation, the lockout of energy source(s) from desired equipment can remain until removed or released by the user.

The digital LOTO method and system can provide various benefits and advantages. By way of example, the digital LOTO method and system can provide a "convenient" approach which can be performed in more useful and convenient locations (e.g., at the load, etc.); can provide an "integrated" approach which can employ electronics and digital controls to replace physical hasps/locks/keys as a primary lockout system; can provide an "intelligent" approach in which software (SW) can enable more robust operator/user error checks, instructions, and so forth; and can provide "value as solution" through the integration of LOTO functionality with various systems such as those for monitoring, managing and/or controlling equipment or process(es) (e.g., can be integrate into existing user applications including but not limited to those associated with designing, creating, updating monitoring, analyzing, managing and/or controlling industrial processes or systems).

For example, as to integration, additional functionality can be provided with knowledge of the process/system which can be available through monitoring, control and/or management system(s) for an industrial process (or the like). It is possible to connect equipment (e.g., device, system, component, etc.) being locked out to process controls using the same process interlocks/sequences to prevent or advise against starting something upstream in the process because downstream equipment is locked out. It is also possible to shut down equipment using process logic as part of LOTO, e.g., user-programmable or based on PLC/control logic, as well as positively establish location(s) for lockout (LO).

In various embodiment, the digital LOTO request from a user can be a request associated with a process (or subprocess), rather than specific equipment. The control system can identify electrically-powered equipment associated with or affected by the process, and the isolation device(s)/system(s) associated with all of the energy sources for the equipment. Thereafter, the control system can implement digital LOTO, for example, to shut down the equipment for the process as well as isolate the energy source(s) from the equipment via the isolation device(s)/system(s), lockout the energy sources from the equipment to prohibit or prevent unauthorized release of the lockout or unauthorized operation of the isolation device(s)/system(s).

In various embodiments, the electrically-powered equipment associated with the digital LOTO request can be associated with a process (or subprocess), which may involve other upstream and/or downstream electrically-powered equipment. The control system can be configured to identify such other equipment and their associated isolation device(s)/system(s), and to perform digital LOTO procedure to lockout all of the energy sources from the other equipment and digitally tagout the lockout event.

In various embodiments, additional confirmation operations can be implemented to verify the equipment from which electrical energy is to be isolated, and to verify the isolation device(s)/system(s) associated with the energy source(s) for the equipment. For example, through the user device, the user can access the LOTO application and input an equipment identifier (e.g., identification information for the equipment) either manually (e.g., entering the serial number or other identifier on the equipment, selecting equipment from a list of equipment, etc.) or using a sensor(s) (e.g., image sensor/camera, etc.) to sense, capture, detect, or scan the equipment identifier (e.g., in code form such as QR other code form, in text (e.g., serial number) at the equipment site, or in other format which can be sensed by a sensor or sensing device). The user device can communicate the equipment identifier or information thereof to the control system for further processing, including confirmation of the equipment.

Furthermore, in various embodiments, the control system can control the isolation device(s)/system(s) for the equipment or an output device(s) such as indicator(s), e.g., a display, LED(s), etc., which is associated therewith to perform a confirmation operation. The confirmation operation can output, via the output device, a confirmation code (e.g., code, image, etc.) which can be inputted by the user to the user device or sensed by the sensor(s) of the user device. The confirmation operation also can take the form of a sequence of operations which can be monitored by the user and inputted by the user to the user device, or which can be sensed by the sensor(s) of the user device. The user device can communicate the confirmation information to the control system for further processing, including confirmation of the isolation device(s)/system(s).

In various embodiments, confirmation from an authorized user also can be requested prior to implementing operations associated with the digital LOTO procedure when performing lockout or release of a lockout of energy source(s) in relation to electrically-powered equipment. For example, the control system may request confirmation to proceed with operations, such as shutdown of equipment or process, isolation of energy source(s) from equipment, lockout of energy source(s) from equipment, release of a lockout of energy source(s) from equipment, connection of energy source(s) to equipment, and activation (e.g., turning ON) of equipment or process (including equipment associated therewith). The control system also can request user confirmation for any other operations to be performed (as described herein) before performing such operation.

In various embodiments, for greater security, the user or user's device can have or be provided with a unique digital key. The digital key can be a general digital key, which is issued to the user to identify the particular user. Such a key can be issued for a registered user on a LOTO control system, or a control system (for an industrial process) which monitors, manages and/or controls the process (including equipment associated therewith) and integrates digital LOTO functionality as described herein. Alternatively, the digital key can be provided on a LOTO transactional basis in relation to a digital LOTO request by the user. The digital key can be provided by the user to the control system for use in authorizing implementation of a digital LOTO request associated with lockout of an energy source(s) from equipment or with release of the lockout to enable connection of the energy source(s) to the equipment. In such embodiments, lockout or release from lockout is prevented or denied without the proper digital key from an authorized user.

In various embodiments, the electrical system can also include sensors such as current, voltage or power sensors at the isolation device(s)/system(s), the equipment or any location therebetween to detect the flow of electrical energy from energy source(s) to the equipment, which can be used to verify whether the energy source(s) has been isolated from the equipment in the electrical system. This information can be notified to the user or other affected users/entities by the lockout. In the event that electrical energy is still flowing to the equipment after lockout, the control system can send an alarm notification to the user and other affected users/entities of the lockout.

In various embodiments, one or more isolation devices/systems can be housed in an enclosure, which is locked by an electronic lock to prevent access to the isolation devices/systems. The control system is configured to communicate with the electronic lock over a network, and can control the electronic lock to lock or maintain a locked state in the event that one or more of the isolation devices/systems or associated equipment or energy source(s) is in a lockout state.

These and other exemplary digital LOTO methods and systems and features associated therewith of the present disclosure will be described herein in detail below with reference to the figures.

FIG. 1 is a block diagram of an example electrical system 100 incorporating digital lockout/tagout (LOTO) functionality, in accordance with an embodiment of the present disclosure. The electrical system 100 can include a plurality of equipment 150, including electrically-powered equipment (e.g., 1 . . . . N), which can receive electrical energy from one or more electrical energy sources 110 across one or more isolation system(s) 120. Each isolation system 120 can include an isolation device(s) 130 for electrically isolating an energy source(s) 110 from one or more equipment 150, an output device 132 for outputting information at the location of the isolation device 130, and a lockout device 140 for locking (or locking out) operation of the isolation device 130 or associated system (e.g., 120). The electrical system 100 also can include a control system(s) 160 and a user device(s) 170 operable by a user, such as an operator, technician, worker or other personnel. The user can interact with the control system 160, via an application(s) such as a LOTO application, to implement digital lockout/tagout (LOTO) of energy sources from one or more equipment for which work is to be performed and other functions and operations.

The equipment 150 can be electrically-powered equipment (also referred to as "electrical equipment"), which can have one or more electrical components which receive electrical energy, such as from one or more energy sources in the electrical system 100. Examples of electrically-powered equipment can include, but is not limited to a motor and/or other motor-related equipment (e.g., motor starter variable frequency drive (VFD), etc.), sensor, transformer, heater, compressor, lighting or other electrically-powered equipment used in a process, facility or system. The process can be an industrial automation process, which can be implemented through the use of various equipment 150 in various industries, such as manufacturing, energy and utilities, transportation, food and beverage, pharmaceuticals and other industries. For example, the industrial process can include a plurality of sub-processes, which can include, for example, a heating process, cooling process, sterilization process, transport process, assembly process, and/or other industrial process or subprocess thereof. In some embodiments, the electrically-powered equipment can be load or load device, or an intermediary device(s) between the energy source(s) and the load(s).

The isolation device 130 can be configured to isolate one or more energy sources 110 from one or more equipment 150. The isolation device 130 can be a circuit breaker(s), disconnect or other switch(es), switchgear, or other device, which can electrically and/or physically isolate one or more energy sources 110 from one or more equipment 150 such as an electrical device(s) or load(s), preferably at proper points for energy isolation in the electrical system 100. For example, the isolation device 130 is operable to isolate/disconnect energy source(s) from equipment 150 or connect energy source(s) to equipment 150. In various embodiment, one or more isolation devices 130 can be located in one or more drawers of an electrical cabinet or enclosure (e.g., a MCC cabinet), a load center, a panelboard, and so forth.

The isolation device 130 can include or have associated therewith an output device 132 through which various types of information can be outputted to the user. Various types of information can be outputted via the output device 132 under control of or at the request of the control system 160 to facilitate confirmation, such as the confirmation of particular isolation system 120/isolation device 130 for particular equipment. In various embodiments, the confirmation information provided through the output device 132 can include a code (e.g., a string/series/combination of characters/numbers, QR code, Bar code, or other code or information which can be recognized by the user or sensed by a sensor (e.g., image sensor, audio sensor, RF sensor, infra-red sensor, etc.)). The output device 132 can include a display or other indictor(s) such as one or more LEDs or the like, or device for outputting information through other sensor-detectable mediums (e.g., sound signals, RF signals, light signals, etc.). In other embodiments, the confirmation information can be outputted by a sequence of operations of one or more components of the isolation device or the output device (e.g., a sequence of ON/OFF LED(s) operations), which can be monitored and sensed by the user or sensor(s) of the user device 170.

The lockout device (LOD) 140 can be a device configured to prevent operation and/or access to operation of isolation device(s) or other devices through which one or more energy sources can be controllably connected to or disconnected from one or more equipment 150. The lockout device (LOD) can be implemented as a mechanical component, electromechanical component, hardware and/or software components, which can be incorporated in or associated with an isolation device(s) 130/isolation system(s) 120 or a device which is used to isolate an energy source 110 from equipment 150. In various embodiments, the lockout device 140 can include a physical locking or lock mechanism (e.g., cam lock, bolt lock, lever lock, trident lock, etc.) or other mechanism(s) to prevent operation of an actuating component(s) or other component(s) of the isolation device (or related component(s) thereto) that are required to operate the isolation device. In other embodiments, the lockout device can be implemented in hardware and/or software to prevent operation of the isolation device, including the connection of an energy source to equipment, under control or management of a control system.

The control system 160 can be a device(s), system(s) or a combination thereof, which can manage, control and/or perform the various functions and operations for digital lockout/tagout (LOTO) and other functions and operations as described herein. The control system 160 can be a computer system(s), which can include among other things at least one or more processor(s), memory, and communication device(s) for conducting communication (e.g., wireless and/or wireline) with other devices or systems. The control system 160 can be configured to receive a LOTO request; identify or confirm equipment for which energy source(s) is/are to be isolated therefrom; identify or confirm isolation points, e.g., isolation system(s) 120/isolation device(s) 130 through which electrical energy is supplied to the equipment from the energy source(s); and to perform digital lockout/tagout (LOTO) procedure for the equipment.

In various embodiment, the control system 160 can perform, in response to a LOTO request, a digital LOTO procedure, which can include: notifying affected users/entities that the equipment will be locked out; controlling shutdown of the equipment; controlling the isolation device(s) to isolate the energy source(s) from the equipment; performing a digital lockout of the energy source(s) from the equipment which sets the lockout status to prohibit or prevent unauthorized operation of the isolation source(s) or unauthorized release of the lockout (or lockout status); and performing digital tagout by providing a digital (or electronic) lockout record (e.g., a digital tag or the like), which can reflect the lockout state of the energy source(s) from the equipment, identify the user responsible for the lockout (as well as any other authorized user associated with the particular lockout), and provide notice to others regarding the lockout of the energy source(s) from the equipment. Accordingly, the control system 160 can be configured to prohibit or prevent unauthorized users (e.g., people other than the user who is responsible for the lockout) from releasing the lockout or operating the isolation device(s) to connect the energy source(s) to the equipment. In this way, a digital lockout can be provided under management and/or control of the control system 160.

In various embodiments, the control system 160 can perform, in response to a request for release of LOTO or lockout for the equipment, other digital LOTO procedures which can include: notifying affected users/entities that the equipment will be released from lockout; releasing, removing, or unlocking the lockout status for the equipment at the request of an authorized user to enable the energy source(s) to be connected to the equipment; providing a release record of the LOTO or lockout-release event; and/or notifying various parties or entities, including the user, that may be affected of the release event. In the event that other equipment were also locked out as a result of the lockout of the equipment, the digital LOTO release procedures (as described above) also can be implemented for the other locked out equipment to release the lockout status of the other equipment.

In various embodiments, the control system 160 can be integrated or associated with electrically-powered equipment 150 for which energy source(s) are to be isolated and locked out therefrom; integrated or associated with components of an electrical system 100 which controls supply of electrical energy from energy source(s) to the electrically powered equipment; or integrated or associated with a control system which manages and/or controls process or sub-process(es) and their associated equipment, including the electrically-powered equipment, for an industrial process, system or facility. The control system 160 can be a computer-based device(s) or system(s), which can be a centralized or distributed control system. In some embodiments, the control system can be or include a controller(s) (e.g., a programmable logic controller or PLCs, etc.), a computer server(s), computer(s), or other computer-based system, which is configured to perform and/or control the performance of various operations associated with digital LOTO as described herein.

In various embodiments, the control system 160 also can monitor, manage and/or control an industrial process (or subprocess) and their associated equipment, and can interact with registered users who may interact with the control system 160 or access various features or operations provided through the system, via the user device 170 over one or more communication network(s). For example, the control system 160 can be an industrial computer for an industrial process (e.g., an industrial automation process) which can control various equipment to implement and control the process. In various embodiments, the control system 160 can be a central or distributed control system including programmable logic controller(s) (PLC(s)), server(s) and/or other computers.

In various embodiments, the digital LOTO procedures or operations associated therewith can be managed, controlled, and/or performed locally through a local LOTO control system (CS) 160A, which may be provided for or incorporated into each isolation system 120. Each local control system 160A can be configured to manage, control and/or perform LOTO operations for the isolation system 120. These LOTO operations can similarly include an initial notification operation to notify affected users/entities that the equipment will be locked out; shutdown operation to shut down the equipment (and/or processes associated therewith); isolation operation to isolate the energy source(s) from the equipment via the isolation device 130; lockout operation to perform a digital lockout of the energy source(s) from the equipment which sets the lockout status to prohibit or prevent unauthorized release of the lockout (or lockout status) or unauthorized operation of the isolation source(s); tagout operation to tagout the lockout event by providing a digital record/tag for the lockout event; and/or notification operation to notify various parties or entities that may be affected by the lockout of the energy source(s) from the equipment. The lockout operation also can include an LOD operation to control the local lockout device 140 to lock the isolation device 130 from being operated. The LOTO procedures for lockout also can include an initial notification operation to notify affected users/entities that the equipment will be released from lockout; release operation to unlock, open or release the lockout at the request of an authorized user to enable the energy source(s) to be connected to the equipment; provide a release record of the LOTO or lockout-release event; and/or notification operation to notify various parties or entities that may be affected of the release event.

In various embodiments, the LOTO operations also can involve management, control and/or performance of confirmatory operations to confirm the isolation system 120 or isolation device 130 which matches the electrically-powered equipment 150 for which work is to be performed thereon, to confirm that the user is an authorized user, or to confirm each or one or more operations to be performed with the user (via the user device) before initiating the operation(s). Each local control system 160A also can coordinate with other computer systems, such as the computer control system 160, to provide for digital LOTO and monitor, manage and/or control the various devices, systems, components and/or equipment in or associated with the electrical system 100. Each local control system 160A also can manage, control and/or perform other operations, including operations described herein.

The lockout record/tag and the lock-out release record can include various information, including the lockout state or release/unlocked state of energy source(s) from the equipment, the date/time of the event (e.g., lockout event, release event, etc.), the user responsible for the event, equipment and/or process(es) affected by the event, entities (e.g., users/systems) to notify or notified for the event, and so forth. These and other event-type or other records can be stored in a relational database or the like on a non-volatile memory.

The user device 170 can be a computer system(s), through which a user can interact with various devices, systems, equipment or other components associated with the electrical system 100 to perform various functions and operations described herein. The user device 170 can be a computer system, such as a portable computer device including a tablet computer, a smartphone, portable or laptop computer, human machine interface (HMI) device(s) or other types of computer system, which can include a processor(s), memory, output device (e.g., display, etc.), input device (e.g., touch screen, key(s), button(s), peripheral device(s), etc.), sensors (e.g., image sensor, audio sensor, position sensor (e.g., GPS), etc.), communication device/interface for wireline or wireless communication, and other components. The user device 170 can, for example, be operated by a user to request among other things the initiation of a digital lockout/tagout (LOTO) for equipment in order to lockout an energy source(s) from the equipment through isolation device(s)/system(s). The user device 170 also can, for example, be operated by the user to request the release, removal or unlocking of a digital LOTO or lockout for equipment in order to release the lockout status and to enable the energy source(s) to be connected to the equipment through isolation device(s)/system(s). The user device 170 also can be operated by a user to implement other functions and features described herein, including but not limited to confirmation operations by the user as well as the receipt of various notifications or other information from the control system 160 (e.g., notification of the lockout or release/unlocked status for equipment by equipment, isolation device(s) and/or energy source(s); alarm notification; shutdown/activation notification of equipment or process, etc.).

In various embodiments, the request for a digital LOTO can be for one or more specified equipment in an industrial process, or for a process (or sub-process) of the industrial process whereby LOTO is thereafter implemented for equipment associated with the process.

In various embodiments, the user device 170 can be a plurality of HMI devices, each of which may be provided on devices, systems, equipment or other components in or associated with the electrical system 100. The HMI devices can be configured to communicate with the control system (e.g., 160 or 160A). For example, an HMI device can be provided on or in a vicinity (or proximity) of equipment 150, and isolation device(s)/system(s). In operation, the user can identify the equipment for LOTO through the HMI device of the equipment, which in turn can inform the user of the matching isolation device(s)/system(s) and location thereof. Thereafter, the user can go to the location of the isolation device(s)/system(s) and perform other LOTO operations, including confirmation operations, through the HMI device for the isolation device(s)/system(s) to lockout the equipment and provide a digital record for the lockout event. To release the lockout for the equipment, the user can go back to the HMI device for the matching isolation device(s)/system(s) and request a release of the lockout, which will initiate the LOTO operations associated with the LOTO release.

Figure 2:
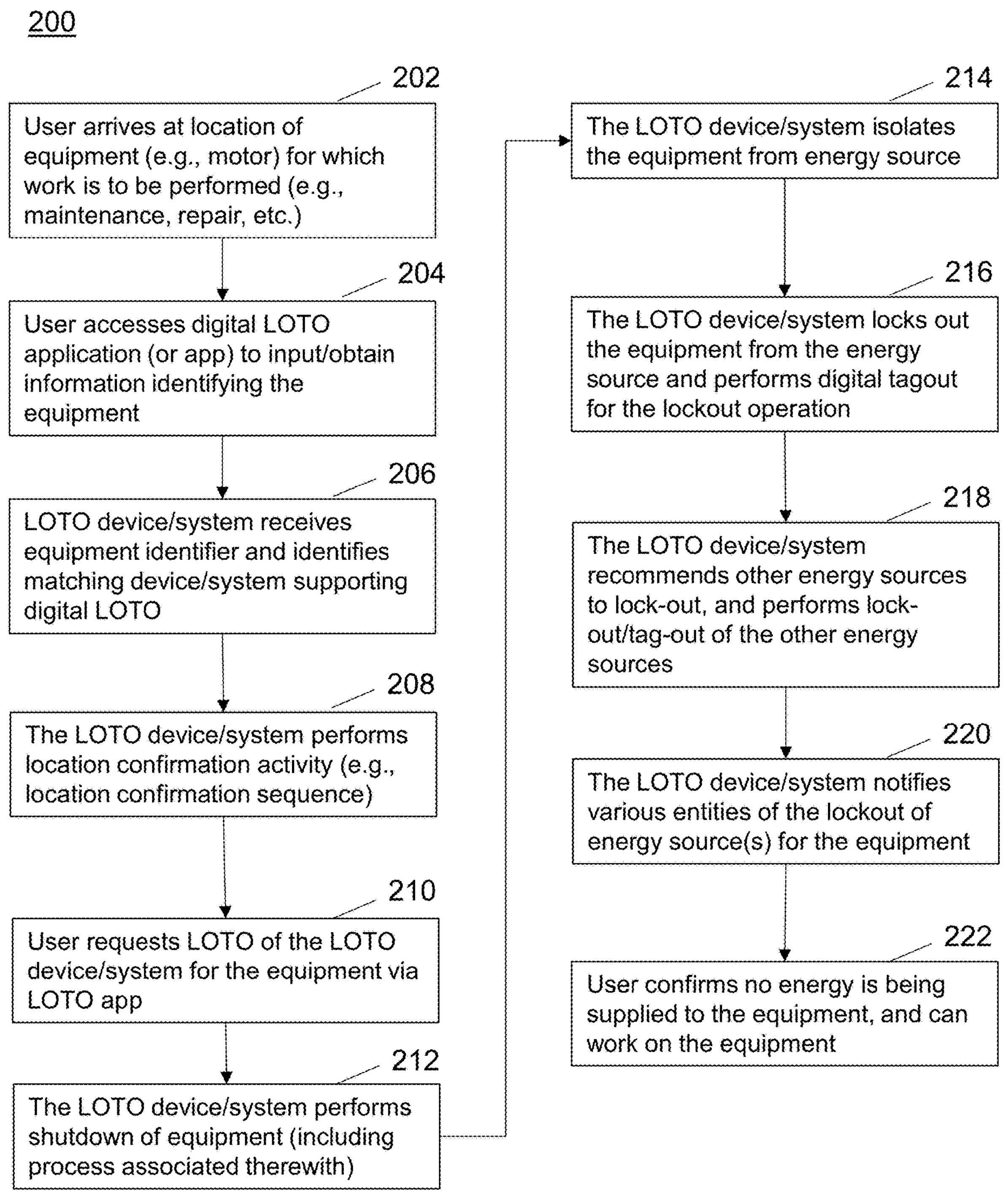
FIG. 2 is a flow chart of an example digital LOTO implementation, in accordance with an embodiment of the present disclosure.

FIG. 2 is a flow chart of a process 200 for implementing a digital lockout/tagout (LOTO) to lockout energy source(s) from equipment, in accordance with an embodiment of the present disclosure. By way of example, the process 200 will be described with reference to a user device (e.g., 170) and a LOTO device/system which can include an isolation system(s) (e.g., 120) and a control system(s) (e.g., 160, 160A) for controlling the operation of the isolation system(s).

At block 202, a user arrives at a location of equipment, e.g., electrically-powered equipment, for which work is to be performed by the user. The work can include service, maintenance, repair, diagnosis or other types of work on the equipment or components thereof or related thereto.

At block 204, the user, via the user device, accesses a digital LOTO application through which a graphical user interface (GUI) can be provided to input/obtain information identifying the equipment, e.g., equipment identifier. The LOTO application can be a local or networked application available through the user device. Such identification information can be inputted by the user into the user device manually through a user interface (e.g., serial number of the equipment or other identifier, etc.) or can be obtained using one or more sensors of the user device. The identifier can be provided through any suitable medium, which is capturable, detectable or recognizable by a sensor(s) on the user device.

The one or more sensors can include an image sensor, infra-red sensor, audio sensor, RF sensor, or other sensor(s) or sensing device(s) through which equipment identifying information can be captured, sensed, detected or recognized depending on the medium through which or on which such information is conveyed from the equipment or an associated output device or for the equipment. For example, the sensors can include an image sensor to capture equipment identifier in the form of QR code, bar code or other image-based code or identifier associated with the equipment, an infra-red sensor to capture infra-red signals of the equipment identifier which is output from an LED or other infra-red output device associated with the equipment, an audio sensor to capture audio signals of the equipment identifier which is output from an audio transducer or speaker associated with the equipment, a RF sensor to capture RF signals of the equipment identifier which is output from an RF transmitter associated with the equipment, and so forth. In various embodiments, the equipment identifier can take the form of an alphanumeric label, QR code, Bar code or other image-or-optically recognizable code or identifier.

At block 206, the LOTO device/system receives information of the equipment identifier from the user device, identifies (e.g., determines, ascertains, etc.) the equipment based on the received information, and identifies matching or corresponding device/system supporting LOTO for the equipment, such as isolation device(s)/system(s) associated with energy source(s) which supply electrical energy to the equipment. The equipment and associated isolation system(s)/device(s) can be identified from information such as a relational database, which can set forth the interrelationship and/or layout between various devices, systems, components, and/or equipment in the electrical system or the process. The relational database can be stored locally or remotely in a memory accessible to the LOTO device/system or components thereof.

In various embodiments, the LOTO device/system can provide the user device with map information, which identifies the isolation device(s)/system(s) for the equipment and can set forth directions for the user to get to the isolation device(s)/system(s). The LOTO device/system can track the movement of the user, via the user device. For example, the user device may have a position sensor (e.g., GPS sensor) which tracks the position of the user device and communicates the position information to the LOTO device/system. In this way, the LOTO device/system can monitor the user and let the user know when the user has arrived at the matching isolation device(s)/system(s) for the equipment. The location information also can be used in a confirmatory operation.

At block 208, the LOTO device/system performs location confirmation activity associated with the matching device/system supporting LOTO for the equipment, such as matching isolation device(s)/system(s). The LOTO device/system can have the isolation device(s)/system(s) or other device(s) associated therewith perform the confirmation activity when the user is located in the vicinity of the isolation device(s)/system(s). For example, the LOTO device/system can control the isolation device(s)/system(s) or other device(s) associated therewith, such as an output device (e.g., 132), to perform a confirmation operation such as a sequence of operations performed by the isolation device(s)/system(s) or the output device (e.g., display, LED(s), etc.) associated therewith. The confirmation operation or information associated therewith can be inputted by the user or captured, detected, sensed or recognized by the user device via one or more sensors, and information associated therewith can be transmitted to the LOTO device(s)/system(s) for location confirmation.

In various embodiments, the location confirmation activity can involve the output device such as indicators, being manipulated by the LOTO device/system to produce a randomized pattern, which can be monitored by one or more sensors of the user device to capture, detect, sense or recognize confirmation information (e.g., randomized pattern) which in turn is provided to the LOTO device/system for location confirmation.

In various embodiments, the location confirmation activity can involve the output device, such as indicators, being manipulated by the LOTO device/system to produce a randomized pattern. The user is then prompted via the user device to match the pattern from the indicators. Alternatively, the user can be prompted through the user device to manipulate inputs in random sequence. The LOTO device/system can manipulate the indicator(s) to produce the random sequence, and the user device can monitor the indicators for the matching input pattern.

At block 210, the user requests, via the user device, a digital lockout/tagout (LOTO) for the equipment, e.g., lockout/tagout of the energy source(s) from the equipment via the isolation device(s)/system(s). The user's request can be inputted through a graphical user interface (GUI) which is provided through the LOTO application and facilitates interaction between the user and the LOTO application and control system which can receive the request.

In response to the LOTO request for the equipment, the LOTO device/system can lockout the energy source(s) from the equipment and provide a digital tagout for the lockout.

For example, at block 212, the LOTO device/system can shut down the equipment and/or process (or subprocess) associated therewith. The LOTO device/system can, for example, directly control shutdown of the equipment and associated process(es), or can interact with other control system(s), which may monitor, manage and control the process(es), to inform them of the lockout request for the equipment and to shut down the equipment and/or associated process(es).

At block 214, the LOTO device/system isolates the equipment from the energy source(s). The LOTO device/system can isolate the energy source(s) from the equipment via isolation device(s)/system(s).

In various embodiment, the equipment can be a motor or equipment associated with the motor. The LOTO device/system can control isolation device(s)/system(s), which may reside in a motor control center (MCC). For example, the isolation device(s)/system(s) can include a bistable mechanism which can engage an actuator interfacing with a contactor mechanical interlock; or a drawer which can be disengaged from power jaws via a stored-energy or separately powered withdrawal mechanism; or a switch or circuit breaker with a physical barrier preventing reclosure of contacts or other mechanical or electro-mechanical mechanisms through which energy source(s) can be disengaged from the equipment.

At block 216, the LOTO device/system digitally locks out the equipment from the energy source(s) by setting the lockout status for the equipment which prohibits or prevents unauthorized release of the lockout status or unauthorized operation of the isolation device(s)/system(s) to connect the energy source to the electrical equipment. The LOTO device/system can provide a digital lockout record (e.g., digital tag) of the lockout event. The record can indicate/reflect/set the lockout status of the energy source(s) from the equipment via the isolation device(s)/system(s), the identity of the user responsible for the lockout, other information associated with the lockout (e.g., time/date of the lockout, other authorized entities, affected process(es), type of work to be performed, etc.), and other information as desired. The lockout record also can provide notice to others of the lockout.

In various embodiments, the record be stored or maintained in non-volatile memory as a distributed database such as a public ledger or the like or as a centralized database. The non-volatile memory can be or include a memory of the isolation device(s)/system(s), the control system(s), the equipment, or the user device or a memory accessible by the isolation device(s)/system(s), the control system(s), the equipment, or the user device.

At block 218, the LOTO device/system can recommend other energy source(s) to lockout, and perform digital lockout/tagout (LOTO) in relation to other energy source(s). For example, the LOTO device/system can identify a process (or subprocess) associated with the equipment for which energy source(s) have been (or will be) locked out (also referred to as locked-out equipment), identify other equipment that is associated with or affected by the process or operate in conjunction with the locked-out (or to be locked out) equipment, identify energy source(s) and isolation device(s)/system(s) associated with the supply of electrical energy to the other equipment, and perform digital lockout/tagout (LOTO) for the other equipment to lockout the energy source(s) from the other equipment and to provide a digital lockout record (e.g., digital tag) for the lockout of energy source(s) from the other equipment. The other equipment can be equipment, which is upstream and/or downstream from the locked-out (or to be locked-out) equipment.

At block 220, the LOTO device/system can notify various entities of the lockout of the energy sources from the locked-out equipment and the locked-out other equipment. Such entities can include the user responsible for the lockout, as well as other people who may be impacted or affected by the lockout, other control system(s) of processes impacted or affected by the lockout, or computer systems including database systems which may update the state of the processes or monitor the processes.

At block 222, the user can confirm that no energy is being supplied to the equipment for which work is to be performed. Once this is confirmed, the user can work on the equipment (e.g., service the equipment, perform maintenance on the equipment, perform diagnostics on the equipment, repair the equipment or perform other tasks on or in relation to the equipment). The electrical system also may incorporate various sensors (e.g., current, voltage or power sensors) at various points in the electrical system to monitor electrical energy flow through the electrical system at various points, including for example at isolation points such as at isolation device(s)/system(s), at the load(s) and/or at the equipment. In this way, the control system can monitor electrical energy flow to equipment, and in the event of a lockout of the equipment, can verify that there is no electrical energy being supplied to the equipment from energy source(s) and notify entities, including the user, who may be affected by the lockout of the monitored electrical energy flow state. An alarm notification can be provided to such entities in the event the electrical energy flow to the equipment is detected when the equipment has been locked out.

Once the user has completed work on the equipment, the user can interact with the LOTO device/system through the user device (e.g., LOTO application), and release the lockout of the energy source(s) from the equipment. As previously discussed, the lockout can only be released by an authorized user, such as the user responsible for the lockout or the original lockout request. An example of a LOTO release implementation is provided with reference to the example in FIG. 4, discussed further below.

The various operation and system environment described with reference to the process 200 above are provided as an example. The various operations of the process 200 can be implemented in various way and in other system environments, including those discussed in other embodiments herein. For example, as previously described, the control system for a LOTO device/system can be a local control system (e.g., 160A) for isolation device(s)/system(s), or can be a distributed or centralized control system (e.g., 160) which also may monitor, manage and/or control the process (or subprocesses) and components thereof (e.g., equipment, devices, systems, etc.) of an industrial process, system or facility.

In various embodiments, in response to the LOTO request, an initial notification also can be provided by the LOTO device/system to entities/users (who may be affected by the lockout) that the equipment will be locked out.

Figure 3:
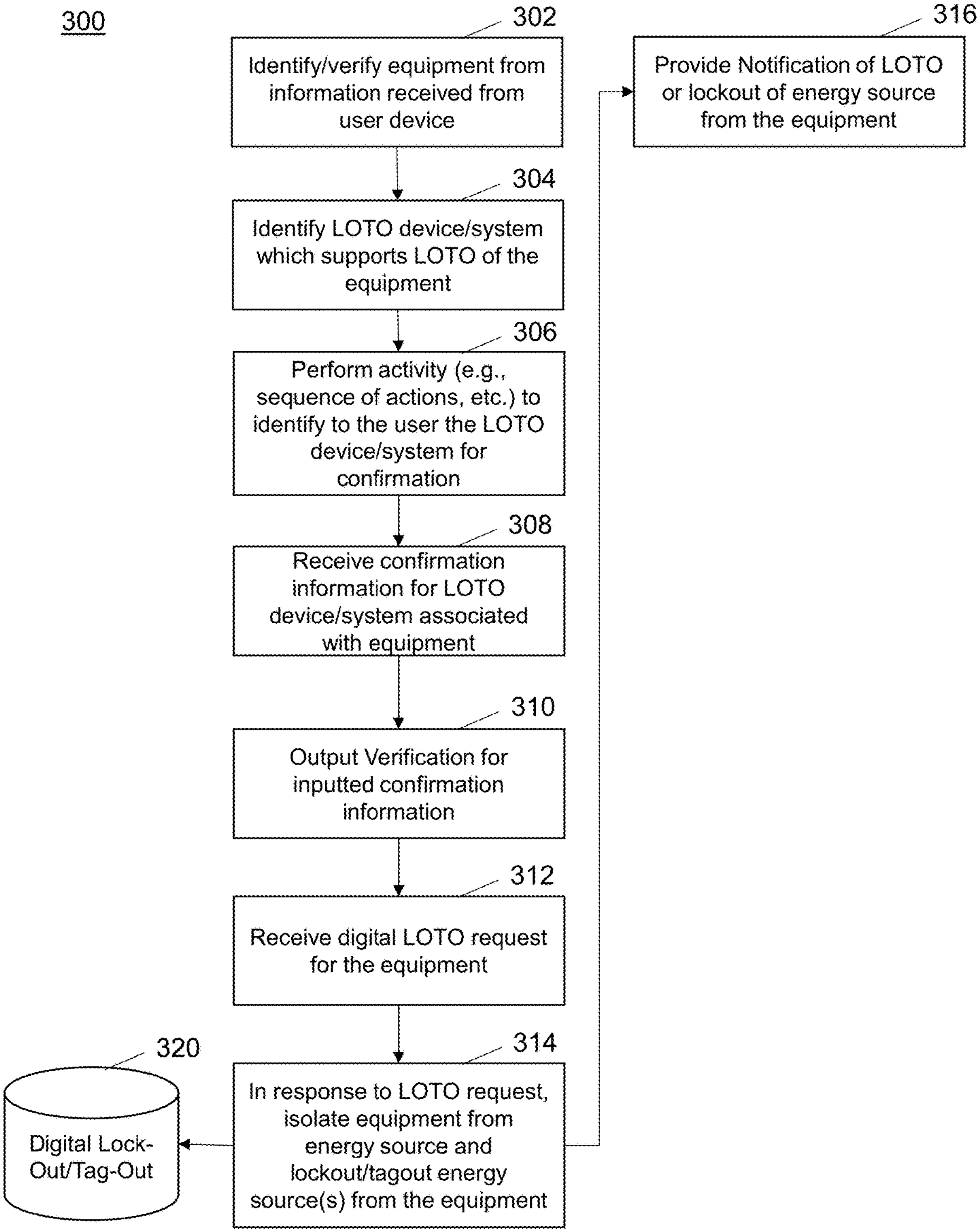
FIG. 3 is a flow chart of an example digital LOTO implementation, in accordance with an embodiment of the present disclosure.

FIG. 3 is a flow chart of a process 300 by which a digital lockout/tagout (LOTO) is implemented, in accordance with an embodiment of the present disclosure. By way of example, the process 300 will be described with reference to a user device (e.g., 170), an isolation system(s) (e.g., 120), and a control system(s) (e.g., 160, 160A). Various operations of the process 300 can be implemented or controlled by the control system (or control system(s)).

At block 302, the control system identifies (or verifies) equipment to be worked on by the user, such as from information (e.g., equipment identifier) received from the user device.

At block 304, the control system identifies LOTO device/system which supports lockout/tagout of the equipment. For example, the control system can identify the isolation device(s)/system(s) through which energy source(s) can be isolated from the equipment. The control system can identify the isolation device(s)/system(s) based on information of the electrical system and/or process(es), which may be stored locally or remotely. Such information can be provided in a relational database (RDB) or the like, which provides for the interrelationship between different component (e.g., equipment, devices, systems, etc.) in the electrical system or process(es).

At block 306, the control system can implement or control the implementation of confirmation activity or operations associated therewith by the isolation device(s)/system(s) or output device associated therewith for location confirmation. The control system also can interact with the user device/user as part of the confirmation activity or operations.

At block 308, the control system confirms (or not) the isolation device(s)/system(s) or the location of the LOTO device/system associated with the equipment, e.g., the isolation device(s)/system(s), through the activity. For example, the control system can receive confirmation information for the isolation device(s)/system(s) from the user device as part of the activity, and confirm the isolation device(s)/system(s) or the location of the LOTO device/system associated with the equipment, e.g., the isolation device(s)/system(s). Other confirmation approaches, including those described herein, can be employed.

At block 310, when confirmed, the control system can output a verification of the confirmation. The verification can be outputted through the output device associated with the isolation device(s)/system(s) or outputted to the user device for display to the user.

At block 312, the control system can receive a request for digital LOTO procedure for the equipment, e.g., a LOTO request to lockout energy source(s) from the equipment via the isolation device(s)/system(s).

At block 314, in response to the LOTO request, the control system can implement or control implementation thereof operations for LOTO procedures. The LOTO operations can include, for example, an initial notification operation to notify affected users/entities that the equipment will be locked out; shutdown operation to shut down the equipment (and/or processes associated therewith); shutdown operation to shut down the equipment (and/or processes associated therewith); isolation operation to isolate the energy source(s) from the equipment via the isolation device (s)/system(s); lockout operation to perform a digital lockout of the energy source(s) from the equipment which sets the lockout status to prohibit or prevent unauthorized release of the lockout (or lockout status) or unauthorized operation of the isolation source(s); tagout operation to tagout the lockout event by providing a digital record/tag for the lockout event; and/or notification operation at block 316 to notify various parties or entities that may be affected by the lockout of the energy source(s) from the equipment. The lockout operation also can include an LOD operation to control the local lockout device 140 to lock the isolation device 130 from being operated. The LOTO procedures for lockout also can manage, control and/or perform confirmatory operations to confirm the device(s)/system(s) which matches the electrically-powered equipment for which work is to be performed thereon, to confirm that the user is an authorized user, or to confirm each or one or more operations to be performed with the user before initiating the operation(s).

As shown in FIG. 3, the lockout status of energy source(s) from the equipment through the isolation device(s)/system(s) can be generated and stored as a record(s) in a relational database 320 on non-volatile memory, which is accessible to the control system. As described herein. The control system can prevent the release of the lockout by unauthorized entity/user according to the lockout status from the database 320.

The various operation and system environment described with reference to the process 300 above are provided as an example. The various operations of the process 300 can be implemented in various way and in other system environments, including those discussed in other embodiments herein. For example, as previously described, the control system can be a local control system (e.g., 160A) for isolation device(s)/system(s), or can be a distributed or centralized control system (e.g., 160) which also may monitor, manage and/or control the process (or subprocesses) and components thereof (e.g., equipment, devices, systems, etc.) of an industrial process, system or facility.

In various embodiments, in response to the LOTO request, an initial notification also can be provided by the control system to entities/users (who may be affected by the lockout) that the equipment will be locked out.

Figure 4:
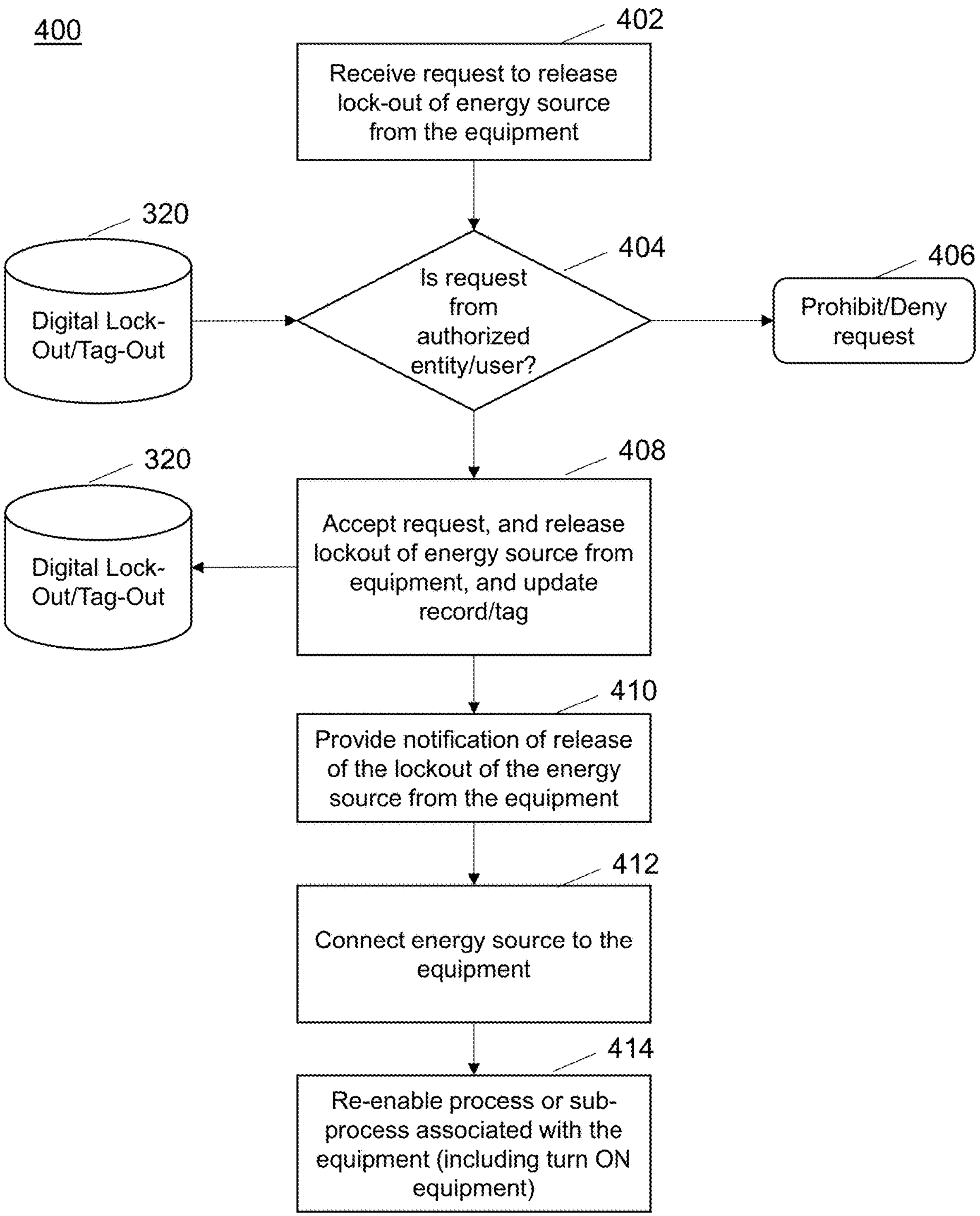
FIG. 4 is a flow chart of an example release implementation for equipment which has been locked out and tagged out through digital LOTO, in accordance with an embodiment of the present disclosure.

FIG. 4 is a flow chart of process 400 for releasing LOTO/lockout of energy source(s) from equipment to enable the energy source(s) to be connected to the equipment, in accordance with an embodiment of the present disclosure. By way of example, the process 400 will be described with reference to a user device (e.g., 170), an isolation system(s) (e.g., 120), and a control system(s) (e.g., 160, 160A). Various operations of the process 300 can be implemented or controlled by the control system(s).

At block 402, the control system can receive a request to release lockout (or lockout state) of energy source(s) from equipment. The control system can receive the request from the user device, through which the user can access and employ the digital LOTO application.

At block 404, the control system checks whether the release request is from an authorized user. For example, the control system can verify the authority of the release-requesting party using user identified information provided from the user device along with the release request or in association with the release request and the information in the database 320 identifying authorized entities including user(s) for one or more lockout events. In various embodiments, the authorized entities for a lockout event can include at least or only the user who originally requested the lockout associated with the lockout event.

In various embodiment, as added security measure and for convenience, the user device may be provided with a general-use digital key associated with the user or associated with a single-use digital key which is particular lockout event. For example, the general-use digital key may be provided to the user device through a user registration process through which the user registers with the control system which manages the LOTO application, and/or manages an industrial process including LOTO functions in the electrical system. The single-use digital key may be generated and provided by the control system to the user, via the user device, for a lockout event. The digital key information may be stored along with event data, including lockout and release records, in the database 320 or in other databases accessible to the control system. In operation, the user device can provide the digital key along with or in association with the release request. The digital key on the user device may be further encrypted, and decrypted by the control system. It should be understood that various authentication schemes can be employed to verify the identity of the user.

At block 406, the release request is prohibited, denied or ignored by the control system if the requesting party is not authorized to release the particular lockout. Accordingly, the control system can restrict access to the release of a lockout (or lockout status) to an authorized entity, e.g., the original LOTO requestor, thereby locking out others who are not authorized to release the lockout.

At block 408, if the request is from an authorized user, the control system accepts and processes the release request, and release the lockout of energy source(s) from the equipment. For example, the control system can update the records on the database 320 to reflect the release, removal, or unlocking of the lockout status. This can include changing/updating the lockout status for the energy source(s), isolation device(s)/system(s) and/or equipment from lockout status to a release/unlocked status (or NO/BLANK status). Furthermore, if a lockout device (LOC) is also employed in the LOTO procedure, the control system can control the lockout device to an unlocked status as well. The control system can remove these and other restrictions in response to an authorized release request to enable energy source(s) to be connected to the equipment. The control system can update the database 320 with a lockout-release record/release state for the equipment.

At block 410, the control system can notify various entities of the release of the LOTO or lockout of energy source(s) from the equipment. The entities to be notified can include the user who requested the lockout or the release, other people impacted or affected by the lockout, other computer systems or applications associated therewith which are impacted or affected by the lockout.

At block 412, the control system can connect the energy source(s) to the equipment, automatically or in response to a request from a user or other computer system.

At block 414, the control system can implement, or control startup of the equipment and/or the process or sub-process(es) associated with the equipment automatically or in response to a request from a user or other computer system.

The various operation and system environment described with reference to the process 300 above are provided as an example. The various operations of the process 300 can be implemented in various way and in other system environments, including those discussed in other embodiments herein. For example, as previously described, the control system can be a local control system (e.g., 160A) for isolation device(s)/system(s), or can be a distributed or centralized control system (e.g., 160) which also may monitor, manage and/or control the process (or subprocesses) and components thereof (e.g., equipment, devices, systems, etc.) of an industrial process, system or facility.

In various embodiments, in response to the LOTO release request from an authorize entity, an initial notification also can be provided by the control system to entities/users (who may be affected by the lockout) that the equipment will be released from lockout.

FIGS. 5 through 11 show various example operations implemented through a user device 170 in relation to a digital lockout/tagout (LOTO) implementation for equipment or associated energy source(s) or isolation device(s)/system(s), in accordance with embodiments of the present disclosure.

Figure 5:
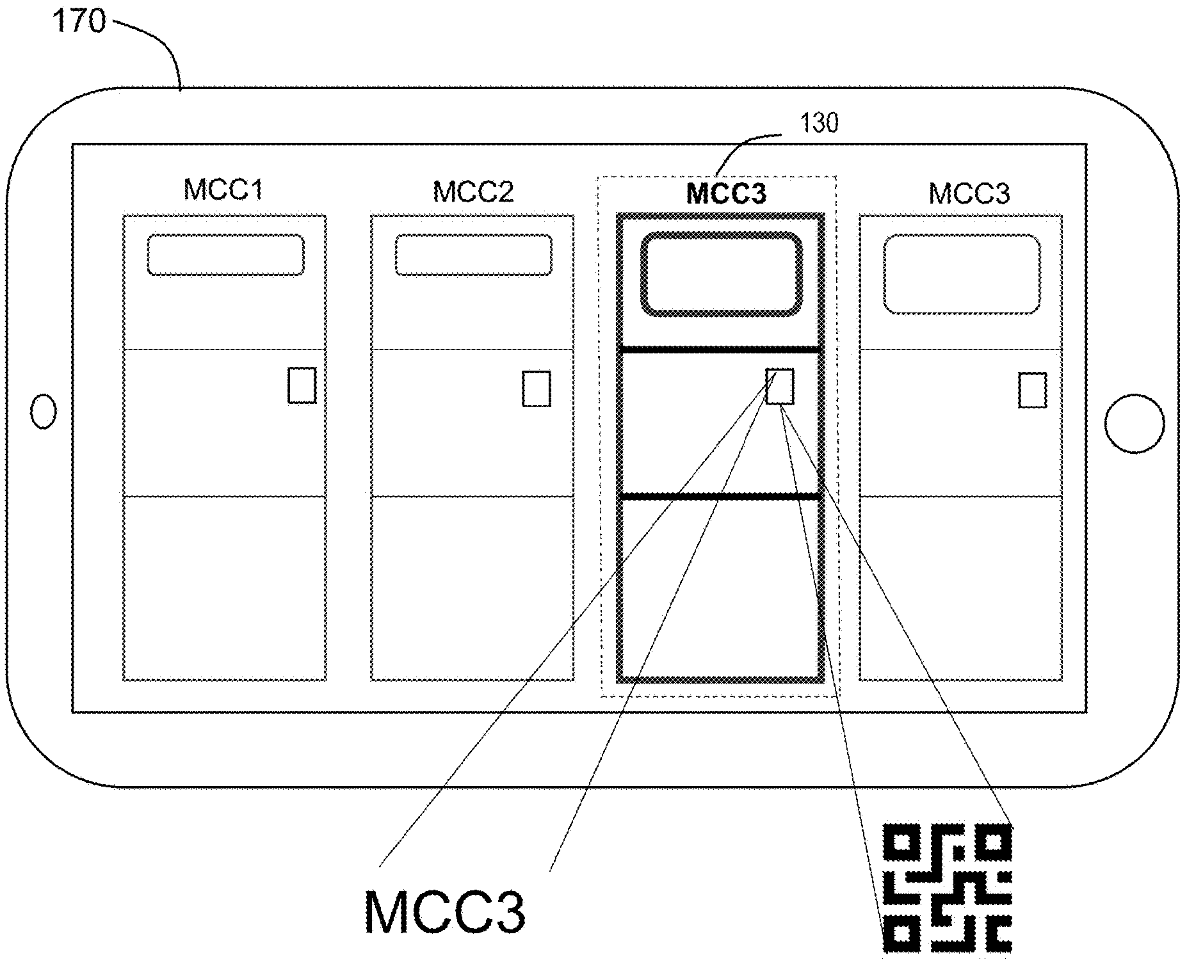
FIGS. 5 through 12 show various example operations implemented through a user device associated with the LOTO implementation for equipment, in accordance with embodiments of the present disclosure.
Figure 6:
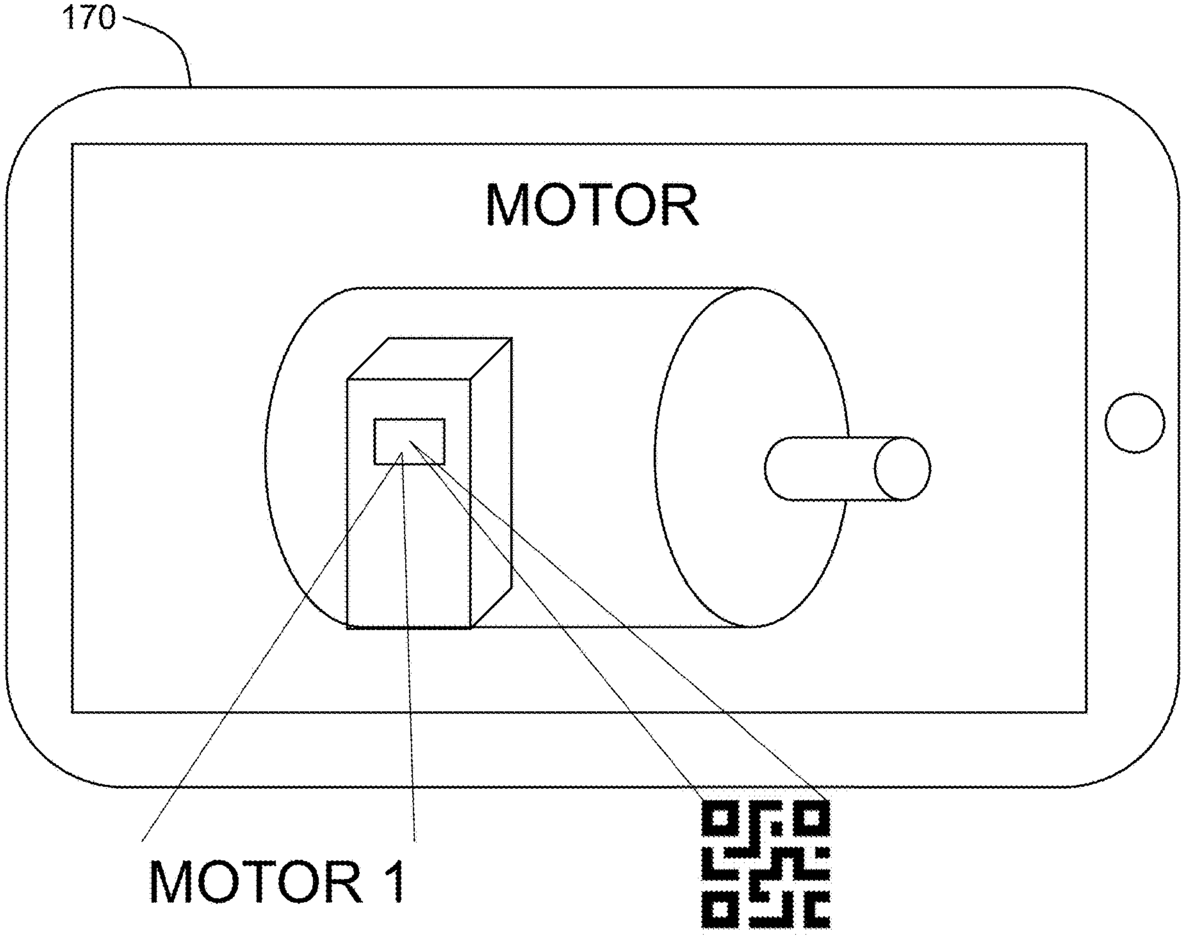

In FIG. 5 and FIG. 6, the user device 170 can employ one or more sensors to capture, detect or obtain identification information for equipment, or in other words, equipment identifier. The equipment can be motor-related equipment in a drawer of a motor control center (MCC) cabinet. As shown, the user device 170 can obtain equipment identifier or information associated therewith from scanning an alphanumerical code (e.g., MCC3) on the equipment or a QR code or other image-based code (e.g., Bar code, etc.) using an image sensor. In FIG. 6, the equipment can be a motor. Similarly, the user device 170 can obtain equipment identifier from scanning an alphanumerical code (e.g., MOTOR 1) on the equipment or a QR code or other image-based code (e.g., Bar code, etc.) using an image sensor. As previously discussed, the equipment identifier or information thereof can be provided to a control system (or the like) for use in LOTO implementation for the equipment, e.g., lockout energy source(s) from desired equipment and provide a digital record (e.g., a tag) for the lockout event. It should be understood that the equipment identification procedures of FIG. 5 and FIG. 6 is provided as an example. Other identification procedures can be employed, including those described herein, to identify the equipment for which LOTO is to be performed.

Figure 7:
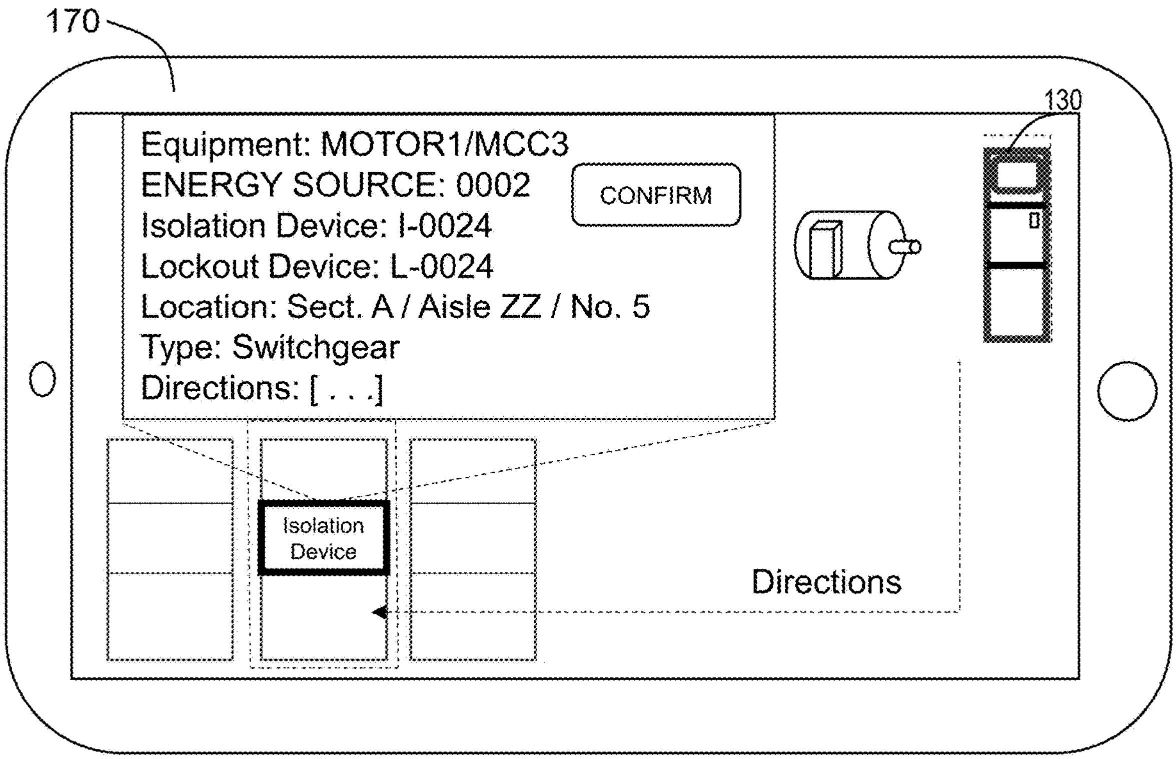

As shown in FIG. 7, the user device 170 can provide or output to the user directions (e.g., text directions or graphical directions using a map) to LOTO supporting device(s)/system(s) for the equipment. Such supporting device(s)/system(s) can be a matching or corresponding isolation device(s)/system(s) through which energy source(s) can be isolated and locked out. In various embodiments, the user device 170 can perform locally the identification operation to identify matching isolation device(s)/system(s) for the equipment, and the direction operation to output directions to the isolation device(s)/system(s). In other embodiments, the control system can perform the identification operation and the direction operations, and provide the identity of the isolation device(s)/system(s) and directions thereto to the user device 170 for output to the user, via user interface.

Figure 8:
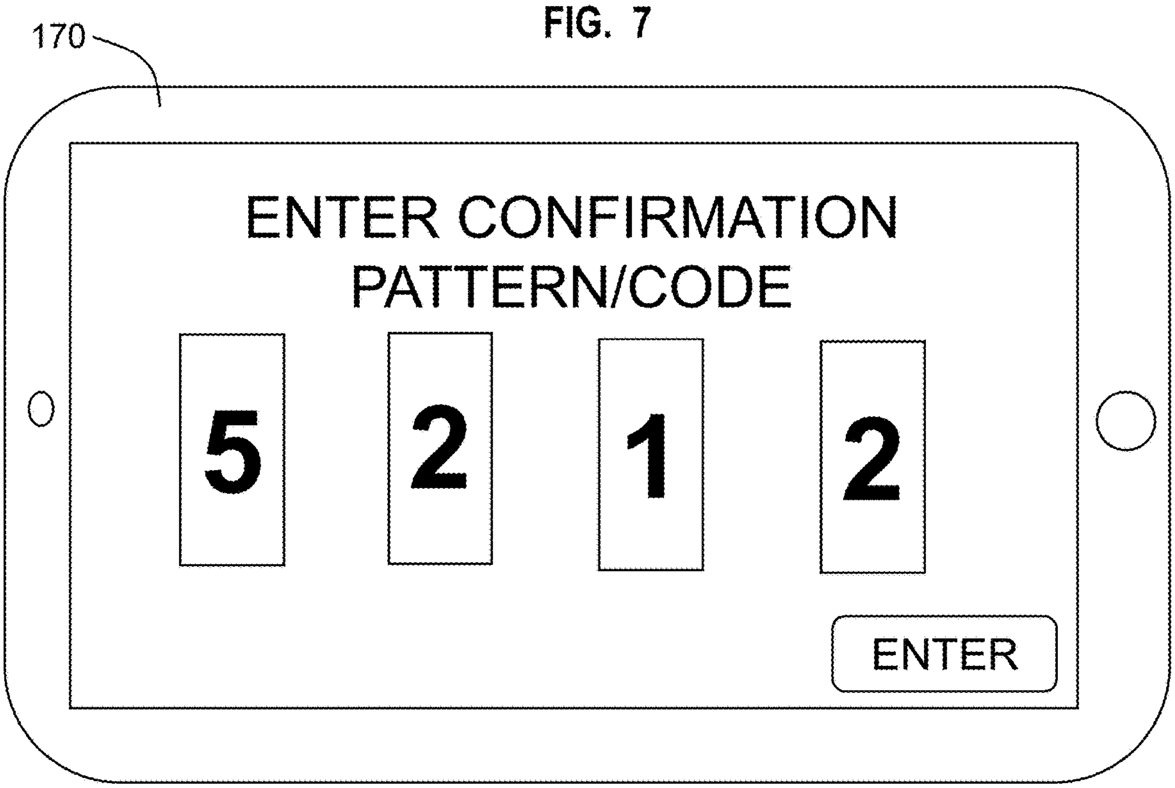

In one example, when the user arrives in the vicinity of the isolation device(s)/system(s), the user may be requested via the user device 170 to confirm the matching isolation device(s)/system(s) or location thereof through a confirmation procedure. As shown in FIG. 7, the user can be provided, via the user device 170, with information regarding the isolation device(s)/system(s) and other associated information, such as equipment, energy source, isolation device, lockout device, location, type of isolation device(s)/device(s) and so forth. To initiate the confirmation procedure, the user can press the CONFIRM button on the GUI of the user device 170. Thereafter, a confirmation operation is performed by the isolation device(s)/system(s) or associated output device. In this example, a confirmation code is output (e.g., 5212). The user can input the confirmation code as shown in FIG. 8, and press ENTER button to submit the code. If the submitted code matches the confirmation code, the location confirmation is verified. It should be understood that the confirmation procedures of FIG. 7 and FIG. 8 is provided as an example. Other confirmation procedures can be employed, including those described herein, to confirm the location of the matching supporting LOTO device/system, e.g., the matching isolation device(s)/system(s) for the equipment.

Figure 9:
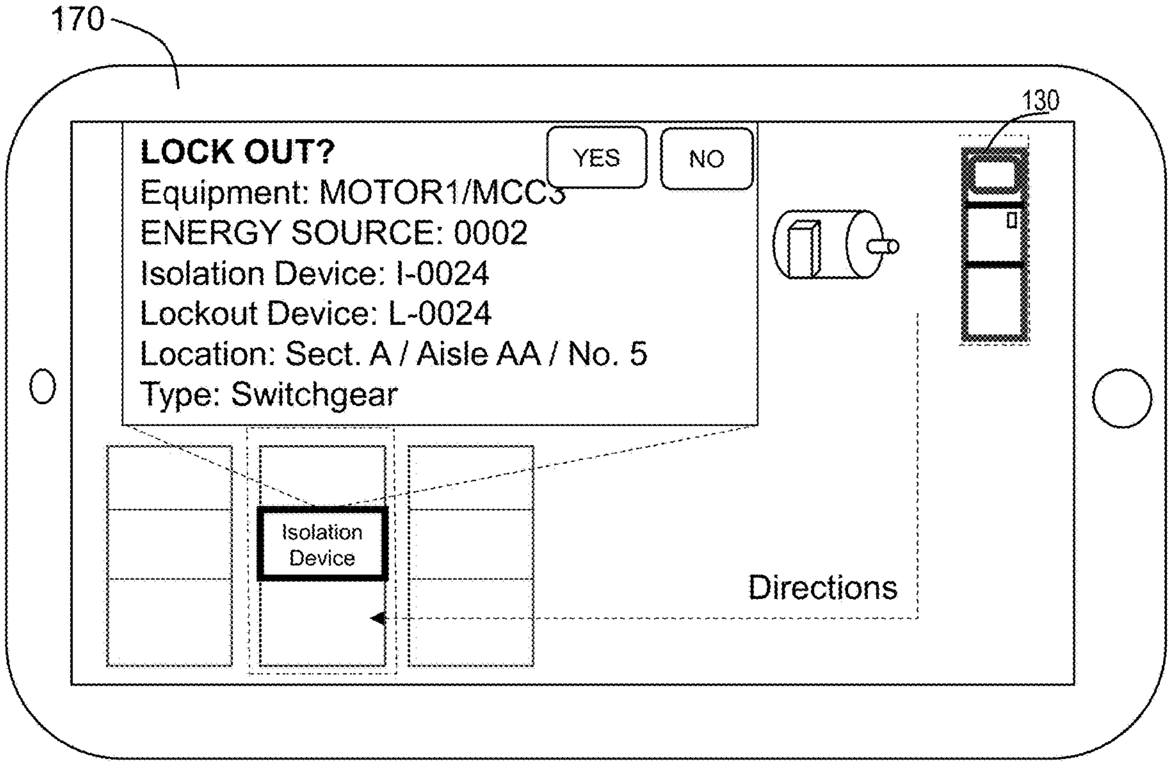

Once the location is confirmed, the user can request digital LOTO for the equipment, e.g., lockout of energy source(s) from the equipment and provision of a digital record (e.g., digital tag) for the lockout event (or transaction). For example, as shown in FIG. 9, the user can select YES to initiate a digital LOTO request for the equipment. Thereafter, as previously discussed, the control system can receive the LOTO request and implement the various operations to lockout energy source(s) from the equipment and to provide a digital record for the lockout event.

Figure 10:
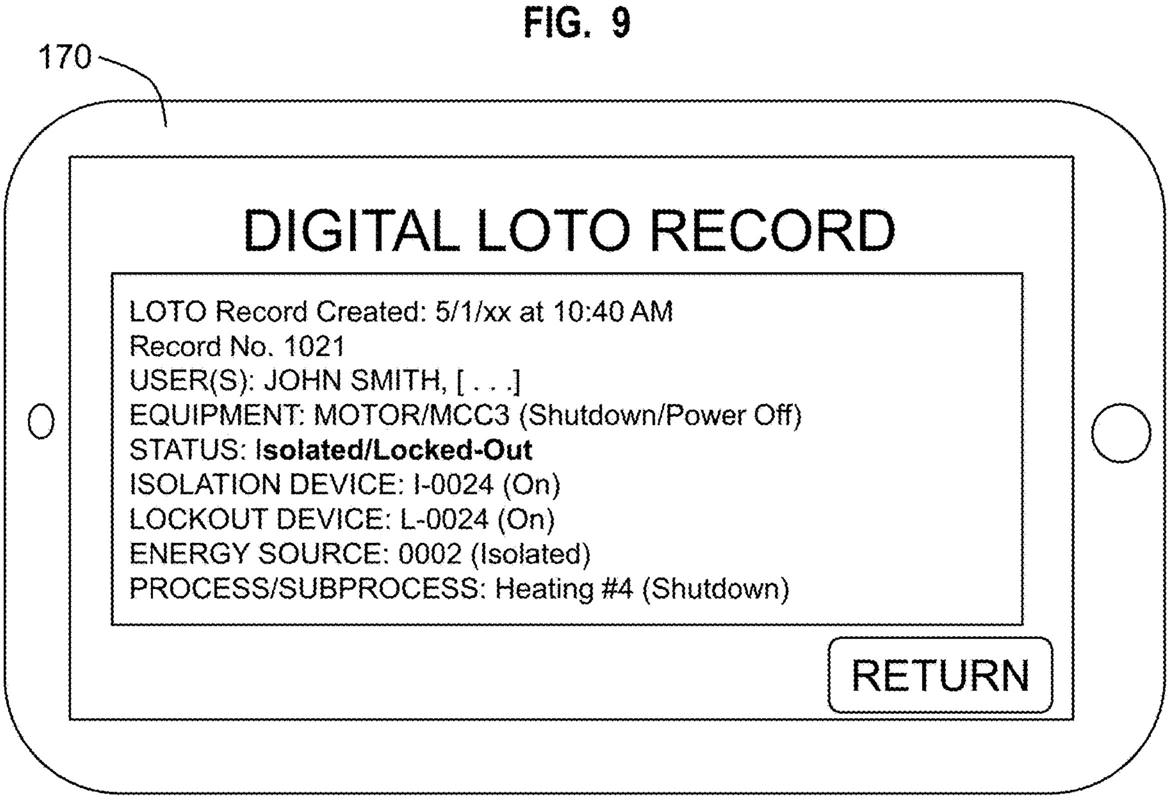

An example of the information in the event record, e.g., the lockout record, is shown in FIG. 10. For example, the lockout record (e.g., a digital tag) can include information including time/date of the lockout event, record number, identity of the user responsible for the LOTO request or lockout, the identity of the equipment, the identity of energy source(s), the identity of the supporting LOTO device/system (e.g., the identity of the isolation device, the identity of the lockout device (LOD), etc.), the identity of the affected or associated process or subprocess, and the lockout status of the energy source(s) from the equipment and any other relevant information related to the lockout event. The information in the lockout record can be outputted on the user device 170 as shown. The user can select RETURN button to return to a home page or other service page provided through the LOTO application or other application.

Figure 11:
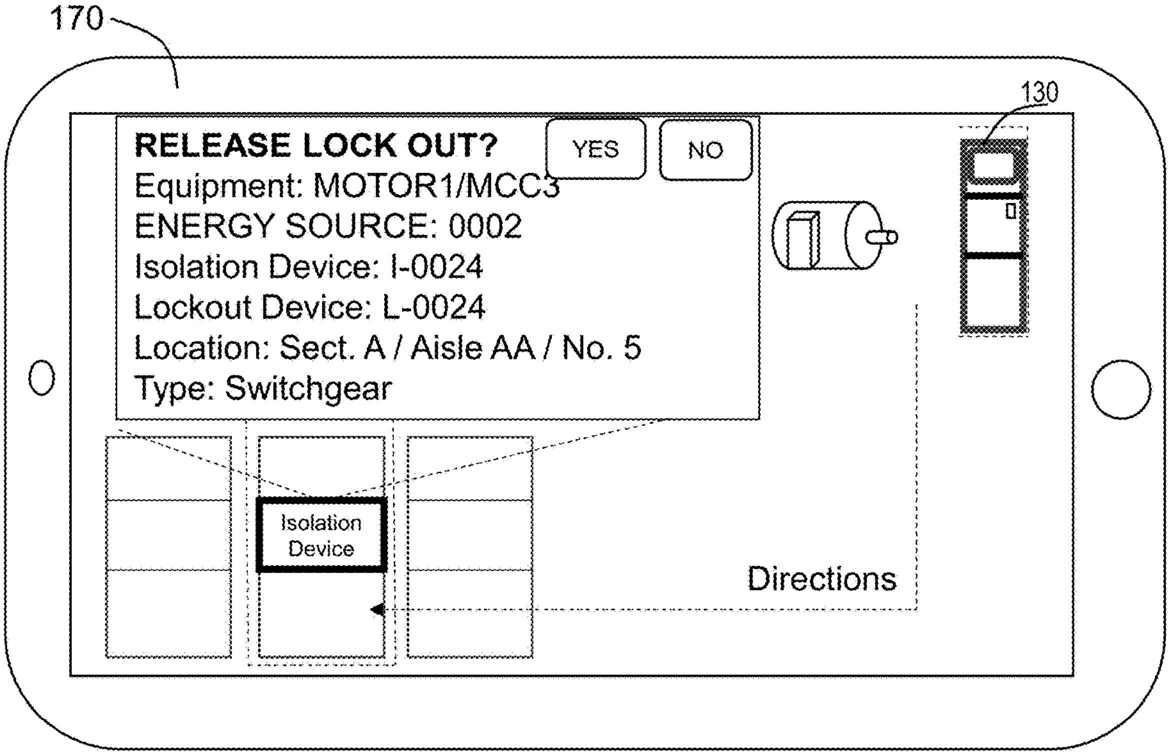

After the user completes work on the equipment, the user can have the digital lockout or status thereof released to enable energy source(s) to be connected to the equipment. For example, the user can interact with the control system via the user device, through the LOTO application, and request the release of the lockout of the energy source(s) from the equipment. As shown in FIG. 11, the user can employ the user device 170 to locate the specific lockout, and select, for example, YES, to initiate the release request for that specific lockout. Thereafter, as previously discussed, the control system can receive the release request, and implement the various operations to release or unlock the lockout of the energy source(s) from the equipment and to provide the digital record for the release event.

Figure 12:
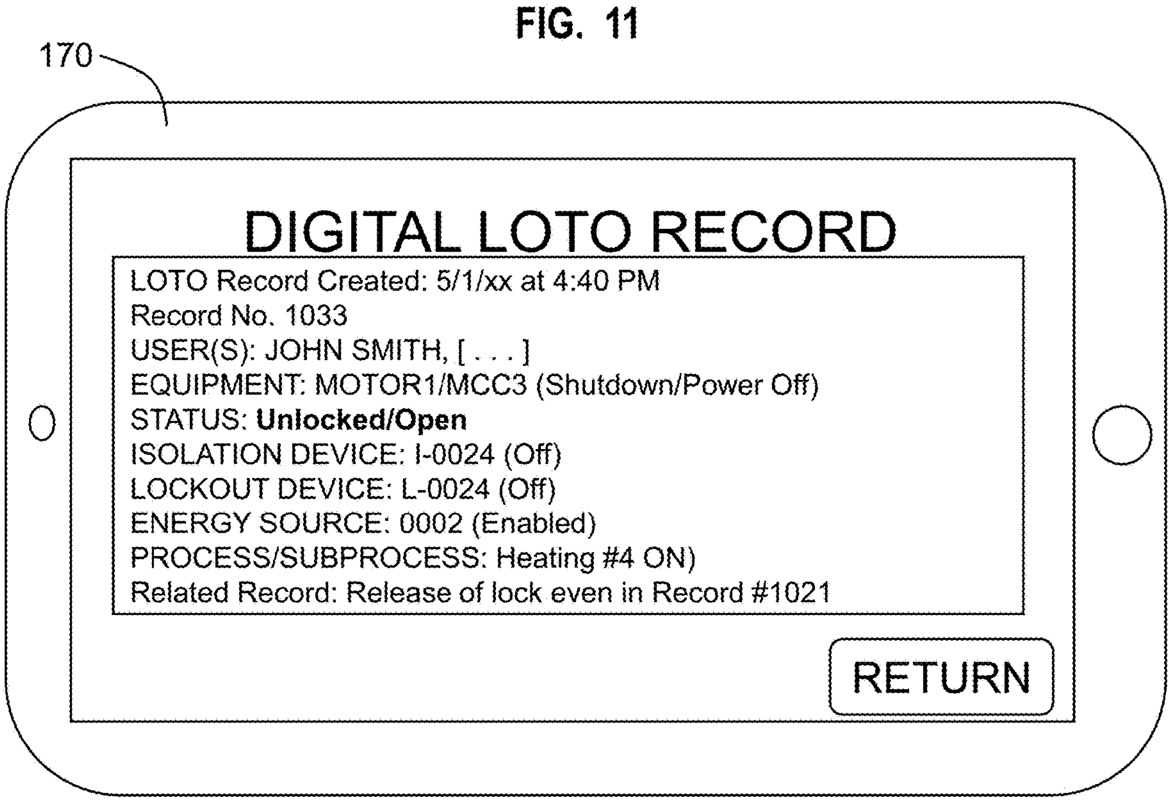

An example of the information in the event record, e.g., the release record for a lockout, is shown in FIG. 12. For example, the release record (e.g., a digital tag) can include information including time/date of the release event, record number, identity of the user responsible for the release of the lockout, the identity of the equipment, the identity of energy source(s), the identity of the supporting LOTO device/system (e.g., the identity of the isolation device, the identity of the lockout device (LOD), etc.), the identity of the affected or associated process or subprocess, and the unlocked/open/released status (or state) of the energy source(s) from the equipment and any other relevant information related to the release event. The information in the release record can be outputted on the user device 170 as shown. The user can select RETURN button to return to a home page or other service page provided through the LOTO application or other application.

It should be understood that FIGS. 5 through 12 are provided as non-limiting examples of LOTO operations from the perspective of the user device. The LOTO implementation through the user device can employ different GUI and present information in different fashion.

Figure 13:
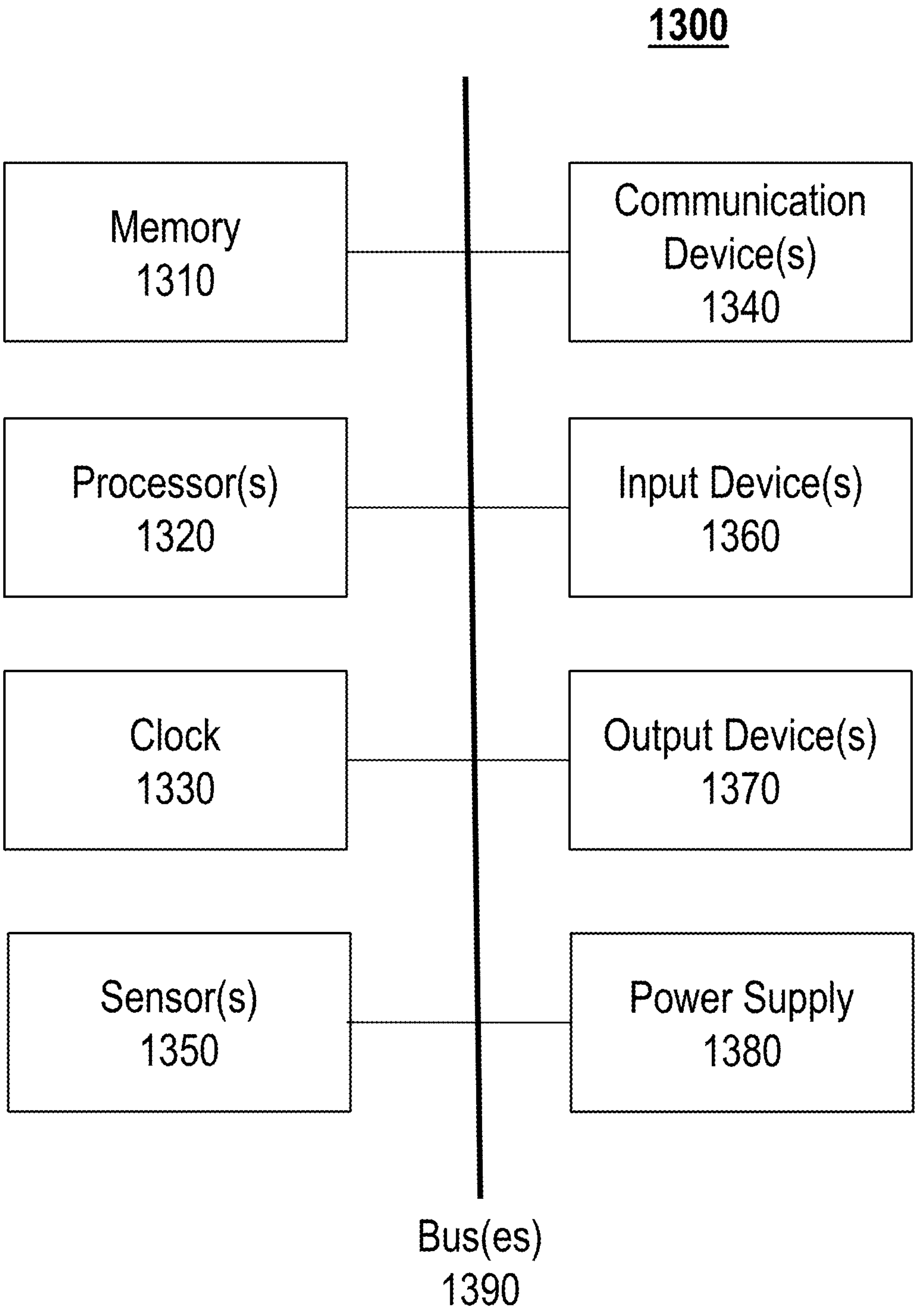
FIG. 13 illustrates example components of a computer device or system, in accordance with an embodiment.

FIG. 13 illustrates example components of a computer-implemented device or system 1200 ("computer system") such as the user device, human machine interface (HMI), or other device or system with processing and communication capabilities, for use in the LOTO environment as described herein, in accordance with an embodiment.

The computer system 1300 can include memory 1310, processor(s) 1320, clock 1330, communication device(s) 1340, sensor(s) 1350, input device(s) 1360, output device(s) 1370, and power supply 1380 which can be connected across a power and communication bus system 1390. The clock 1330 can be used to time-stamp data or an event with a time value, and synchronize operations within the device and with remote devices or a system, such as other devices, systems and equipment in the electrical system/LOTO environment. The communication device 1340 can include transmitters and receivers for conducting wireless communications or wireline communications with other remote devices.

The memory 1310 can store computer executable code, programs, software, or instructions, which when executed by a processor(s), controls the operations of the device 1300, including the various processes described herein. The memory 1310 can also store other data used by the device 1200 or components thereof to perform the operations described herein. The other data can include but is not limited to user identifier, event record(s), database(s), digital key, and other data described herein.

The processor(s) 1320, which interacts with the other components of the computer-implemented device, is configured to control the various components of the system 1399 and can control or implement the various operations and functions described herein.

The sensor(s) 1350 can include image sensor, position sensor (e.g., GPS sensor), infra-red sensor, audio sensor, RF sensor or other types of sensor including sensors for detecting, sensing, recognizing, capturing or obtaining information from various mediums (e.g., image, light signals, RF signals, infra-red signals, audio signals, etc.). The sensor(s) 1350 can be used to obtain information from the environment of the user device.

The above describes example components of a computer-implemented device or system. The computer-implemented device may or may not include all of the components of FIG. 13, and may include other additional components to facilitate operation of the processes and features described herein.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware, or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s), controller(s) or processing unit(s) as described herein can be a processing system, which can include one or more processors, such as CPU, controller, ASIC, or other processing unit or circuitry, which controls or performs the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

What is claimed is:

1. A computer-implemented method of facilitating worker safety in an electrical system, comprising:

receiving a request from a user to perform a lockout/tagout for equipment in the electrical system;

identifying isolation device(s) for electrically isolating the equipment from electrical energy source(s) in the electrical system; and performing a digital lockout/tagout procedure for the equipment, including:

controlling shutdown of the equipment;

controlling an operation of the isolation device(s) to isolate the equipment from the electrical energy source(s);

performing a digital lockout for the equipment by setting a lockout status for the equipment which prohibits or prevents unauthorized release of the digital lockout; and providing a digital record of the digital lockout which reflects a lockout status of the electrical energy source(s) from the equipment, identifies the user responsible for the request, and provides notice of the lockout status of the electrical energy source(s) from the equipment.

2. The computer-implemented method according to claim 1, wherein the performing the digital lockout further comprises:

controlling a lockout device(s) to lock the isolation device(s), thereby preventing operation thereof and/or access thereto.

3. The computer-implemented method according to claim 1, wherein the equipment is associated with a sub-process or sub-system of an industrial process, the method further comprising:

identifying other equipment for the sub-process or sub-system of the industrial process in the electrical system; and controlling shutdown of the other equipment, or performing a digital lockout/tagout for the other equipment.

4. The computer-implemented method according to claim 1, wherein the performing the digital lockout/tagout procedure further comprises:

electronically notifying one or more entities of the lockout status of the electrical energy source(s) from the equipment.

5. The computer-implemented method according to claim 1, further comprising:

receiving identifier data from a user device identifying the equipment; and searching a database to identify the equipment from a plurality of equipment in the electrical system based on the identifier data, wherein the identifier data is obtained by the user device at a location of the equipment using one or more sensors of the user device.

6. The computer-implemented method according to claim 1, further comprising:

controlling the isolation device(s) or an output device(s) associated therewith to perform a confirmation operation, from which information is obtained by the user for confirmation of the isolation device(s) or position thereof, wherein, the digital lockout/tagout procedure is performed after confirmation of the isolation device(s) or position thereof, in response to the request, and wherein the confirmation operation is a sequence of operations which are performed by the isolation device(s) or the output device(s) associated therewith.

7. The computer-implemented method according to claim 1, wherein the digital record or lockout status for the equipment is stored in database as a public ledger on non-volatile memory.

8. The computer-implemented method according to claim 1, further comprising:

receiving a release request for releasing the lockout status of the electrical energy source(s) from the equipment;

checking whether the release request is from an authorized entity, the authorized entity including at least the user; and in response to the release request being from an authorized entity, releasing the digital lockout or state thereof to enable the electrical energy source(s) to be connected to the equipment via the isolation device(s).

9. The computer-implemented method according to claim 1, further comprising:

generating a unique digital key for the user; and providing the digital key to a user device for use in releasing the digital lockout of the electrical energy source(s) from the equipment.

10. The computer-implemented method according to claim 1, wherein the request is to perform the lockout/tagout procedure for equipment for a sub-process or sub-system of an industrial process, the method further comprising:

identifying each of the equipment in the sub-process or sub-system of the industrial process, wherein the digital lockout/tagout procedure is performed for each of the identified equipment for the sub-process or subsystem.

11. A system for facilitating arc fault detection on an electrical system, comprising:

a memory; and a processor, in communication with the memory, configured to:

receive a request from a user to perform a lockout/tagout for equipment in the electrical system;

identify an isolation device(s) for electrically isolating the equipment from an electrical energy source(s) in the electrical system; and perform a digital lockout/tagout procedure for the equipment, including:

control shutdown of the equipment;

control an operation of the isolation device(s) to isolate the equipment from the electrical energy source(s);

perform a digital lockout for the equipment by setting a lockout status for the equipment which prohibits or prevents unauthorized release of the digital lockout; and provide a digital record of the digital lockout which reflects a lockout status of the electrical energy source(s) from the equipment, identifies the user responsible for the request, and provides notice of the lockout status of the electrical energy source(s) from the equipment.

12. The system according to claim 11, wherein, to perform a digital lockout, the processor is further configured to control a lockout device(s) to lock the isolation device(s), thereby preventing operation thereof and/or access thereto.

13. The system according to claim 11, wherein the equipment is associated with a sub-process or sub-system of an industrial process, the processor is further configured to:

identify other equipment for the sub-process or sub-system of the industrial process in the electrical system; and controlling shutdown of the other equipment, or performing a digital lockout/tagout for the other equipment.

14. The system according to claim 11, wherein, to perform the digital lockout/tagout procedure, the processor is further configured to:

implement electronic notification, to one or more entities, of the lockout status of the electrical energy source(s) from the equipment.

15. The system according to claim 11, wherein the processor is further configured to:

receive identifier data from a user device identifying the equipment; and search a database to identify the equipment from a plurality of equipment in the electrical system based on the identifier data, wherein the identifier data is obtained by the user device at a location of the equipment using one or more sensors of the user device.

16. The system according to claim 11, wherein the processor is further configured to:

control the isolation device(s) or an output device(s) associated therewith to perform a confirmation operation, from which information is obtained by the user for confirmation of the isolation device(s) or position thereof, wherein, the digital lockout/tagout procedure is performed after confirmation of the isolation device(s) or position thereof, in response to the request, and wherein the confirmation operation is a sequence of operations which are performed by the isolation device(s) or the output device(s) associated therewith.

17. The system according to claim 11, wherein the digital record or lockout status for the equipment is stored in database as a public ledger on non-volatile memory.

18. The system according to claim 11, the processor is further configured to:

receive a release request for releasing the lockout status of the electrical energy source(s) from the equipment;

check whether the release request is from an authorized entity, the authorized entity including at least the user; and in response to the release request being from an authorized entity, release the digital lockout or state thereof to enable the electrical energy source(s) to be connected to the equipment via the isolation device(s).

19. The system according to claim 11, wherein the processor is further configured to:

generate a unique digital key for the user; and provide the digital key to a user device for use in releasing the digital lockout of the electrical energy source(s) from the equipment.

20. The system according to claim 11, wherein the request is to perform the lockout/tagout procedure for equipment for a sub-process or sub-system of an industrial process, the processor being further configured to:

identify each of the equipment in the sub-process or sub-system of the industrial process, wherein the digital lockout/tagout procedure is performed for each of the identified equipment for the sub-process or subsystem.

21. A non-transitory computer medium storing computer executable code, which when executed by one or more processors, implements a method of facilitating worker safety in an electrical system, the method comprising:

receiving a request from a user to perform a lockout/tagout for equipment in the electrical system;

identifying an isolation device(s) for electrically isolating the equipment from an electrical energy source(s) in the electrical system; and performing a digital lockout/tagout procedure for the equipment, including:

controlling shutdown of the equipment;

controlling an operation of the isolation device(s) to isolate the equipment from the electrical energy source(s);

performing digital lockout for the equipment by setting a lockout status for the equipment which prohibits or prevents unauthorized release of the digital lockout; and providing a digital record of the digital lockout which reflects a lockout status of the electrical energy source(s) from the equipment, identifies the user responsible for the request, and provides notice of the lockout status of the electrical energy source(s) from the equipment.

* * * * *